(12) United States Patent
Boyle et al.

(10) Patent No.: US 11,743,132 B2
(45) Date of Patent: Aug. 29, 2023

(54) MOST PROBABLE CAUSE DETERMINATION FOR TELECOMMUNICATION EVENTS

(71) Applicant: Ribbon Communications Operating Company, Inc., Westford, MA (US)

(72) Inventors: Charles W. Boyle, Upton, MA (US); Sreenivas NVR Kaki, Nashua, NH (US); Nizar K. Purayil, Bangalore (IN); Vsevolod V. Ostapenko, Boxborough, MA (US)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 129 days.

(21) Appl. No.: 16/962,814

(22) PCT Filed: Jul. 12, 2019

(86) PCT No.: PCT/US2019/041543
§ 371 (c)(1),
(2) Date: Jul. 16, 2020

(87) PCT Pub. No.: WO2020/014574
PCT Pub. Date: Jan. 16, 2020

(65) Prior Publication Data
US 2021/0056487 A1    Feb. 25, 2021

Related U.S. Application Data

(60) Provisional application No. 62/763,969, filed on Jul. 12, 2018.

(51) Int. Cl.
*H04L 41/16* (2022.01)
*G06F 16/907* (2019.01)
(Continued)

(52) U.S. Cl.
CPC .......... *H04L 41/16* (2013.01); *G06F 16/907* (2019.01); *G06F 18/2148* (2023.01);
(Continued)

(58) Field of Classification Search
CPC . G06Q 10/06393; G06F 16/907; H04L 60/65; H04L 65/1104; H04L 41/0631;
(Continued)

(56) References Cited

U.S. PATENT DOCUMENTS 8,565,076 B2    10/2013  Kovvali et al.
8,732,170 B2 *   5/2014  Kalavade ........... G06Q 10/0637
                                                    707/736
(Continued)

FOREIGN PATENT DOCUMENTS

EP    3197097 A1 *  7/2017  ......... H04L 41/0631
EP    3197097 A1    7/2017
(Continued)

OTHER PUBLICATIONS

European Patent Office, Communication—European Search Report dated Mar. 11, 2022 for Application No. 19834784.1, 8 pages, Munich Germany.
(Continued)

*Primary Examiner* — Dylan C White
(74) *Attorney, Agent, or Firm* — Haynes and Boone, LLP

(57) ABSTRACT

A method performed by a computing system includes collecting information on transactions in a telecommunication system, using the information on transactions to create a plurality of event objects, each of the event objects associated with a telecommunication event, associating each of the event objects with a Key Performance Indicator (KPI), applying the event objects to a plurality of inference functions, each inference functions using the set of parameters as inputs and the KPIs of the event objects as outputs to create
(Continued)

a model that infers a relationship between the set of parameters and the KPIs, and analyzing metadata from each of the inference functions to determine which of the set of parameters was used to predict an outcome leading to the KPI.

20 Claims, 6 Drawing Sheets

(51) Int. Cl.
*G06Q 10/0639* (2023.01)
*G06N 5/04* (2023.01)
*H04L 41/5009* (2022.01)
*H04L 43/0817* (2022.01)
*H04L 43/0823* (2022.01)
*H04W 24/08* (2009.01)
*H04L 41/0631* (2022.01)
*H04L 65/65* (2022.01)
*G06N 3/08* (2023.01)
*H04W 24/02* (2009.01)
*H04W 24/04* (2009.01)
*H04W 24/10* (2009.01)
*H04L 65/1073* (2022.01)
*H04M 3/51* (2006.01)
*H04L 65/1104* (2022.01)
*G06F 18/23* (2023.01)
*G06F 18/214* (2023.01)
*G06F 18/2415* (2023.01)

(52) U.S. Cl.
CPC ........ *G06F 18/23* (2023.01); *G06F 18/24155* (2023.01); *G06N 3/08* (2013.01); *G06N 5/04* (2013.01); *G06Q 10/06393* (2013.01); *H04L 41/0631* (2013.01); *H04L 41/5009* (2013.01); *H04L 43/0817* (2013.01); *H04L 43/0823* (2013.01); *H04L 65/1073* (2013.01); *H04L 65/1104* (2022.05); *H04L 65/65* (2022.05); *H04M 3/5175* (2013.01); *H04W 24/02* (2013.01); *H04W 24/04* (2013.01); *H04W 24/08* (2013.01); *H04W 24/10* (2013.01)

(58) Field of Classification Search
CPC . H04L 41/16; H04L 41/5009; H04L 43/0817; H04L 43/430823; H04L 65/1073; G06K 9/6218; G06K 9/6257; G06K 9/6278; G06N 3/08; G06N 5/04; H04M 3/5175; H04W 24/02; H04W 24/04; H04W 24/08; H04W 24/10
See application file for complete search history.

(56) References Cited

U.S. PATENT DOCUMENTS

| | | | |
|---|---|---|---|
| 8,755,297 B2 | 6/2014 | Kalavade | |
| 8,908,507 B2 | 12/2014 | Kovvali et al. | |
| 9,204,329 B2 | 12/2015 | Boyle et al. | |
| 9,204,474 B2 | 12/2015 | Kovvali et al. | |
| 9,414,248 B2 * | 8/2016 | Kowali | H04L 41/5009 |
| 10,643,146 B1 * | 5/2020 | Basu | G01V 11/002 |
| 11,271,795 B2 * | 3/2022 | Bhalla | H04L 41/147 |
| 2009/0075648 A1 | 3/2009 | Reed et al. | |
| 2009/0075655 A1 | 3/2009 | Dobson et al. | |
| 2010/0082125 A1 | 4/2010 | Pingel | |
| 2016/0261468 A1 * | 9/2016 | Premkumar | H04L 41/069 |
| 2016/0349960 A1 | 12/2016 | Kumar et al. | |
| 2017/0034014 A1 | 2/2017 | Bingham et al. | |
| 2018/0084049 A1 | 3/2018 | Wu et al. | |
| 2020/0151577 A1 * | 5/2020 | Ogawa | G06Q 20/308 |
| 2022/0006704 A1 * | 1/2022 | Boyle | G06N 3/08 |

FOREIGN PATENT DOCUMENTS

| | | | |
|---|---|---|---|
| EP | | 3342146 A1 | 7/2018 |
| EP | | 3342146 B1 | 3/2021 |
| WO | WO 2017/037598 A1 | | 3/2017 |

OTHER PUBLICATIONS

European Patent Office, Communication—European Search dated Mar. 9, 2022 for Application No. 19833131.6, 8 pages, Munich Germany.

European Patent Office, Communication—European Search dated Mar. 11, 2022 for Application No. 19834934.2, 8 pages, Munich Germany.

European Patent Office, Communication—European Search dated Mar. 1, 2022 for Application No. 19834933.4, 9 pages, Munich Germany.

European Patent Office, Communication—European Search dated Mar. 11, 2022 for Application No. 19834784.1, 8 pages, Munich Germany.

International Searching Authority, PCT Notification of Transmittal of the International Search Report and the Written Opinion of the International Searching Authority, or the Declaration dated Oct. 7, 2019, for International Appl. No. PCT/US2019/041543, 7 pages, Alexandria, VA.

* cited by examiner though the present discussion describes determining the most probable cause for a KPI within the context of a telecommunication network, it is understood that the principles described herein may be applied in other contexts. For example, the principles described herein may be used to debug network usage for applications such as video, messaging, voice, gaming, web-browsing, or other application where events can be captured and KPIs can be defined to measure performance. The principles described herein may also be used to detect anomalies, or security threats in the network where abnormal patterns are found including scanning, (e.g. rogue client is attempting to connecting to many user devices, port scanning via Transmission Control Protocol (TCP) or call scanning for international call backs), denial-of-service attacks. In these scenarios the KPIs are a classification or categorization, or example of these issues. The principles described herein may also be applied to analyzing behavioral pattern changes where human or IOT end-user's usage patterns change resulting in a different set of behaviors indicators. For example, the amount of data uploaded by sets of devices changes from small to enormous. Indicators may capture changes associated with time of day, mobility patterns, etc. In each of these examples, certain "key indicators" may leverage the principles described herein to automatically determine what is driving the indicators for network failure cases, security/threats or behavioral changes.

MOST PROBABLE CAUSE DETERMINATION FOR TELECOMMUNICATION EVENTS

PRIORITY INFORMATION

This application is a U.S. National Stage patent application of International Patent Application No. PCT/US2019/041543 filed on Jul. 12, 2019, which claims the benefit of U.S. Provisional Patent No. 62/763,969 filed Jul. 12, 2018 and entitled "A Method for Automatically Classifying Network Performance and Degradation and Corrective Action Given Network Data Events and Key Performance Indicators," the disclosures of which are hereby incorporated by reference in their entirety.

BACKGROUND

Network service providers such as mobile operators, cable operators or Internet service providers spend a disproportionate amount of time and money operating the network as compared to the original cost of network roll-out. This stems from the complex relationship of layered, multi-vendor network elements, geographically disperse communication, mesh of interconnectivity to handle capacity and failures, as well as the historical nature of the services which require backwards compatibility with the end-users (e.g. service subscribers). A critical component in maintaining these networks is the software that delivers core operational functions such as performance monitoring, and fault management ultimately contributing to the analysis and resolution.

Traditional systems that implement this core function include an over-arching Operational Support System (OSS), one or more Network Management System (NMSs), and many Element Management Systems (EMSs). This hierarchy allows each subsystem to attempt to correlate cause within its scope. That is, the EMS system may realize what is causing Key Performance Indicator (KPI) issues with underlying network elements (e.g. router, switch, application gateway). The NMS may correlate across multiple network elements associated with a particular vendor product suite, and the OSS may look to diagnose failures across multiple vendors with the details from underlying systems.

As the network size, number of subscribers, types of user devices, and services increase, various types of KPIs, and their associations and densities relative to specific locations, network elements, device types etc., may be over-whelming to service personnel and take significant times to navigate through many UI screens.

BRIEF DESCRIPTION OF THE DRAWINGS

The present disclosure is best understood from the following detailed description when read with the accompanying figures.

DETAILED DESCRIPTION

Figure 1:
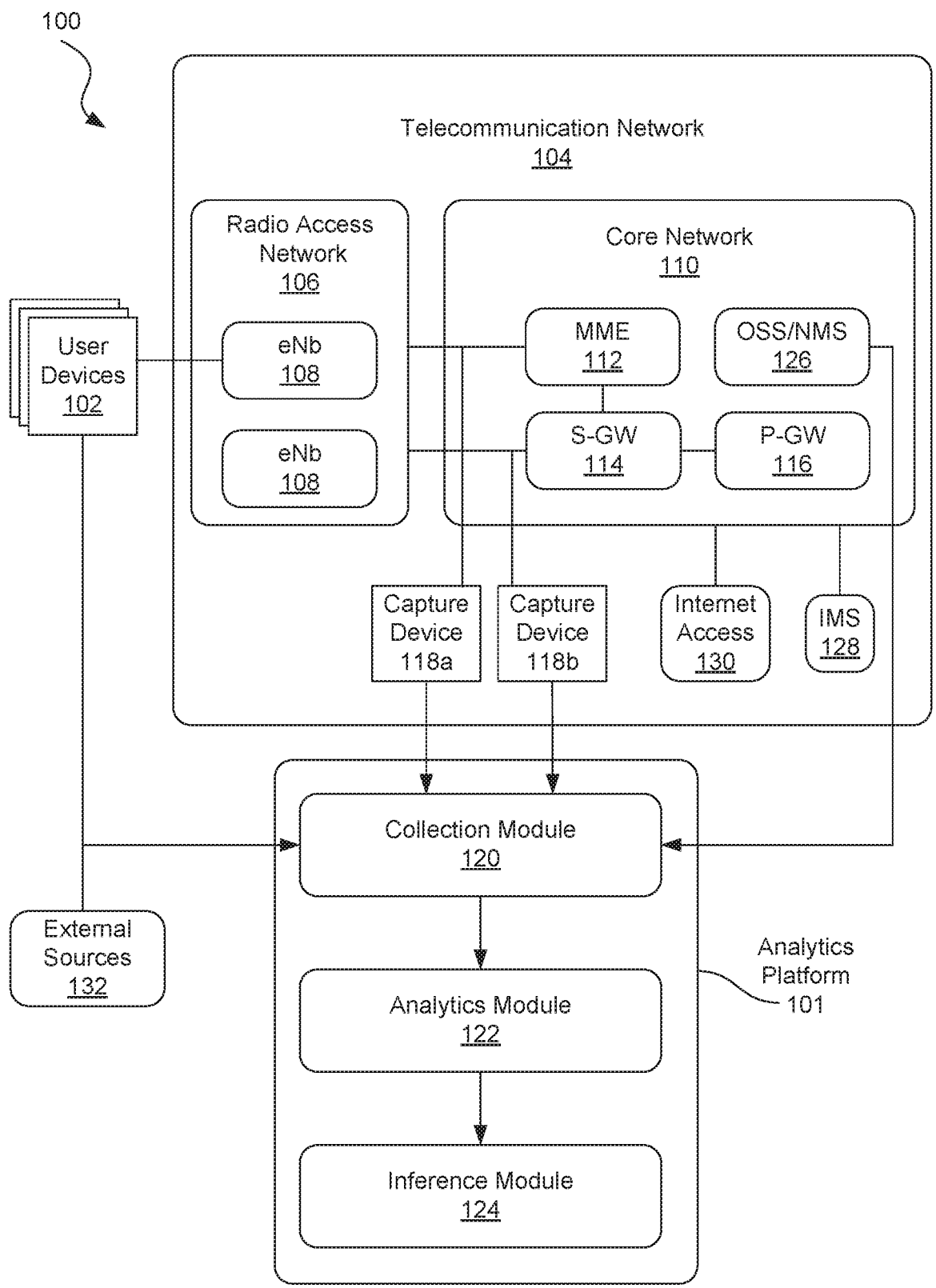
FIG. 1 is a diagram showing an illustrative environment in which the most probable cause for a KPI may be determined, according to one example of principles described herein.

The following disclosure provides many different embodiments, or examples, for implementing different features of the invention with a focus on voice calls over data networks within an LTE network, or VoLTE. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As mentioned above, as the network size, number of subscribers, types of user devices, and service offerings increase, various types of KPIs, and their associations and densities relative to specific locations, network elements, device types etc., may be over-whelming to service personnel and takes significant time to navigate through many UI screens or inspect data sources through other tools (e.g. SQL query). Thus, it becomes difficult to properly diagnose problems within the network even with purposely built tools and solutions. This is because there are many factors that may affect whether a particular call (or web access, video delivery, game session, etc) is successful. In order to run various analytical functions on large amounts of data it may be desirable to classify certain telecommunication events into various KPI categories. For example, one KPI may be a failed registration. Another KPI may be a dropped call. However, because there are so many factors that can lead to a particular "bad" KPI such as a dropped call, it can be difficult to identify the most probable cause from the collected data.

According to principles described herein, data from a telecommunication network is collected and put into a data structure referred to as an event object. An event object relates to a telecommunication event such as a call, an attempted call, a registration, or an attempted registration. The event object may include several parameters associated with the event such as the type of user device used as well as the network components involved. The event object may also include various protocol transactions such as a SIP INVITE or a SIP REGISTER transaction that are associated with a telecommunication event. The event object may also include parameters from multiple protocols, transit network element IDs (eNodeB, SGW), network element vendor/model names, and locally determined status values such as timeouts, inactivity, dropped call etc., associated with the event. The transaction information may be used to associate the event object with a particular KPI such as a failed registration or a dropped call. The event objects for a particular KPI may then be passed through a number of inference functions (i.e., machine-learning functions) that infer relationships between the parameters of the event objects (e.g., device type, network elements) and the particular KPI. Conventional use of such inference functions may be to construct a model that allows one to predict that for a certain set of input parameters from the event objects, a particular KPI may result. However, such conventional use takes a tremendous amount of time to engineer input parameters to ensure accuracy for each model, do not easily handle changes in data, and may not inform one as to what is primarily reason for the KPI degradation. Using principles described herein, the metadata generated by the inference functions may be used to determine which of the parameters are primarily responsible for driving the output of the model to the particular KPI. Those input parameters may then be deemed the most probable cause of the KPI.

FIG. 1 is a diagram showing an illustrative environment 100 in which classification of telecommunication event objects may be performed. According to the present example, the environment includes a telecommunication network 104 that establishes communication sessions between devices 102. In the present example, the telecommunication network 104 is a Long Term Evolution (LTE) network, which may be used to provide VoLTE services. However, the principles described herein may be applied to other types of networks, such as 3G networks, 5G networks, cable networks, and the like.

In short, the telecommunication network 104 may include various capture devices 118a, 118b that collect information from network events, such as communication sessions or calls. That captured information is then provided to a collection module 120. The collection module 120 includes hardware and/or logic for taking the information captured by the capture devices 118a, 118b and putting it into a particular data structure. Such data structure may be referred to as an event object. The event objects created by the collection module 120 are then provided to the analytics module 122 for classification. The classified event objects are then provided to the inference module 124 to infer relationships between input parameters (e.g., device, region, protocol) and output parameters (KPIs).

An event object may include information from multiple protocols (for example, SIP, RTP, S11-MME etc.) that are involved in a VoLTE call. Because a specific attribute such as IMSI & CallID may not be present in every protocol associated with a particular call, the information from multiple protocols may be used to identify common attributes across two or more protocols. For example, voice call identifiers are present in SIP, and not present in RTP and S11-MME. Similarly, an IMSI identifier is present in S11-MME but not present in SIP, RTP etc. S11-MME includes user plane tunnel establishment procedures and user plane tunnel identifiers (which are also present in S1U user plane tunnels that carry SIP and RTP traffic), tunnels-ID may be used to correlate between S11-MME & S1U user planes that carry SIP and RTP protocol packets. Thus IMSI information in the event objects may be determined by correlating between S11-MME and S1U protocol data. Similarly CallID information may be populated in an event object by correlating SIP data with SDP and RTP protocols. The protocol flows for multiple protocols may be correlated pairwise by matching common attribute fields and temporal sequence of protocols such as, for example, S1-MME exchange preceded S1-U/SIP traffic and protocol insights.

In further detail, the telecommunication network 104 includes a radio access network 106 and a core network 110. The radio access network 106 includes the stations (in this case eNodeB's 108) that wirelessly connect to mobile devices, such as the user devices 102. Such wireless devices may be referred to as User Equipment (UEs). The user devices 102 may include any piece of hardware and/or software that is capable of interfacing with the telecommunication network 104. For example, a user device 102 may include a smart phone, a desktop computer, a laptop computer, a tablet computer, or other computing system. The user devices 102 may interface with the telecommunication network using a variety of telecommunication protocols. For example, the user devices 102 may communicate using SIP and Real-time Transfer Protocol (RTP). Other protocols are contemplated.

As mentioned above, while the telecommunication network 104 may be one of a variety of types of networks offering a number of applications and services, the present example is an LTE network that may provide Voice over Long Term Evolution (VoLTE) services. A VoLTE service establishes packet-switched connections between two user devices using the media bearer plane of the LTE standards.

Continuing this example, the telecommunication network 104 may include various pieces of infrastructure. For example, the telecommunication network 104 may also include a core network (Referred to as Evolved Packet Core (EPC)) that includes a Mobility Management Entity (MME) 112, a Service Gateway (S-GW) 114, a Packet Data Network (PDN) Gateway (P-GW) 116, and an Operations Support System (OSS) and a Network Management System (NMS) 126. The core network 110 may provide connection to the Internet through the internet access module 130 and various IP multimedia (IMS) servers 128. In other examples where the telecommunication network is a VoIP network, the infrastructure may include a variety of internet servers.

The MME 112 is a control-node for the LTE access-network. It is responsible for idle mode UE (User Equipment) paging and tagging procedure including retransmissions. The MME 112 is involved in the bearer activation/deactivation process and is also responsible for choosing the SGW for a UE at the initial attach and at time of intra-LTE handover involving Core Network (CN) node relocation. It is responsible for authenticating the user (by interacting with the Home Subscriber Server (HSS)). The MME 112 checks the authorization of the UE to camp on the service provider's Public Land Mobile Network (PLMN) and enforces UE roaming restrictions. The MME 112 handles the security key management. Interception of signaling is also supported by the MME, such as the capturing performed by capture device 118a. For example, signaling traffic exchange with the MME may be mirrored by the MME or mirrored by a transit network device such as a router or tapped by optical tap, and fed to the capturing device 118a The SGW 114 routes and forwards user data packets, while also acting as the mobility anchor for the user plane during inter-eNodeB handovers and as the anchor for mobility between LTE and other 3GPP technologies. The SGW 114 manages and stores UE contexts, e.g. parameters of the IP bearer service, network internal routing information. It also performs replication of the user traffic for interception.

The PGW 116 provides connectivity from the UE to external packet data networks by being the point of exit and entry of traffic for the UE. A UE may have simultaneous connectivity with more than one PGW for accessing multiple PDNs. The PGW performs policy enforcement, packet filtering for each user, charging support, lawful interception and packet screening. Another role of the PGW is to act as the anchor for mobility between 3GPP and non-3GPP technologies.

The capture devices 118 may include various probes, deep packet inspection devices, or other virtualized packet analysis functions that collect the data being transmitted to either the MME or the SGW. For instance, each capture device may collect and decode data packets and send digest of the data packets to the analytics platform 101. The digest of the data packets may include particular protocol events, associated network elements associated with the activity, call or flow identifiers, other application/protocol specific information elements (e.g. web site, location, etc), specific measurements (e.g. upstream/downstream packets, upstream/downstream bytes, inter-packet measurements, latency between certain procedures, etc), The capture devices 118 may include, for example, a Data Capture Engine (DCE) and a Network Data Processor (NDP). The DCE may capture the relevant data and the NDP may process that data. The NDP may then pass the data to the analytics platform 101, and more particularly, the collection module 120 of the analytics platform 101. In some examples, the collection module 120 instructs the capture devices 118a, 118b to collect specific types of data. For example, the collection module 120 may detect a negative event such as a dropped call, or a threshold number of dropped calls, and request that the capture device provide specific pieces of information.

The data capture devices 118a, 118b (via optical TAP, port mirror, bump-in-the-wire, etc.), may have intermittent packet losses, due to network/memory/CPU load or due to race conditions in protocol processing. For example, if a tunnel deletion event from S11 is processed by the DCE before all the data corresponding to that tunnel, the tunnel may be marked as deleted and the remaining data of that tunnel may not be processed correctly. Because the DCE is acting on a copy of the packets, while the end-systems processes correctly, DCE interpretation may be inaccurate in some cases. These cases are accommodated by multi-protocol correlated view of a call, rather than depending on a specific protocol; for example, if 200OK response is missing for an INVITE transaction, but there is bidirectional RTP data for a time greater than a configured period, and bidirectional data is greater than configured value, the call could be considered as successful. Similarly, if INVITE transaction is missing, and 200OK (INVITE) is received the Analytic system per the current technique considers the call as successful.

In some examples, the capture devices only record data for a preset period of time in the past. For example, the capture devices 118a, 118b may collect event data for the past hour and store it in a First In First Out (FIFO) buffer. Thus, any new data coming in overwrites the oldest data. If the capture devices 118a, 118b receive a request from the collection module for certain data, then the data in the buffer may be sent to the collection module 120.

The collection module 120 includes the hardware and/or software to receive data from the capture devices and create a data structure that stores various pieces of information about a particular event (e.g., call). The collection module 120 may receive data from other sources such as the user devices 102, the OSS/NMS 126, and other external sources 132 such as blogs of experience or network outage, security threats impact the area associated with user devices (e.g. Apple, Android), applications (e.g. YouTube player), services (e.g. email, voice calls), or Operating Systems/versions (e.g. OSX 13, iOS 10), etc. Such a data structure may be referred to as an event object 301 which comes in several forms such as failed call 202, failed registration 204, etc and will be discussed in further detail below with the text accompanying FIG. 2. The collection module 120 may include one or more computing systems such as servers.

The collection module 120 may also perform various operations on the data it receives to format it for classification and inference. For example, the collection module may perform a dimensional drill down to identify specific dimensions worth taking a closer look at. Specifically, the collection module 120 may identify the top dimensions for each class of failure or anomaly and suggest focus points for deeper analysis. It groups failures and protocol anomalies (such as interpacket gaps, packet drops, jitter etc.), as major categories and failure types and identifies dominant dimensions for drill-down. For example, the major categories may include repeat calls, dropped calls, one-way calls etc. Protocol KPI based characterization (based on protocol cause codes, observed packet behavior etc.) and failure type are identified. The failure types identified are suggestive of cause of failure, and include device cause, RAN-cause, core network cause, IMS-cause, and the like.

The collection module 120 may also reduce the data into smaller samples. More specifically, the collection module may reduce the data volumes (table rows) in a plurality of tables (for example SIP, RTP, S11, Sv etc., in 3GPP VoLTE deployments) by using the value of dimension attributes (for example, regional_area=Southeast), from the alarm/error/warning/Information alerts together with the time-window of the event and reduce the data scope in multiple tables. The data reduction removes bias due to the large normal data and facilitates faster convergence of the inference functions (which will be described in further detail below). Because the percentage of failures in a stable service provider network is very small (<1%), the data reduction is significant. If the data reduction is done in a transit network element on the edge of the network before being stored in a data warehouse, the amount of storage may be significantly reduced.

To further reduce the amount of data, extraneous data for successful or non-problematic calls may be reduced significantly. Specifically, for non-problematic calls that follow the normal setup sequence via SIP, and exchange data via RTP without voice/video quality problems, and successfully terminate using SIP/BYE method, the only interesting attributes may be total duration and voice quality (Uplink/Downlink MOS scores) or reduction in event objects to only represent a statistically accurate sampling. Thus, other data from such event objects may be removed. In some examples, if the Mean Opinion Score (MOS) scores are computed in real-time on the collected RTP/RTCP parameters, MOS scores for the duration of the call may be sufficient for the analytic system. The remaining fine-grained data may be unimportant. However, for problematic calls, fine-grained data from SIP/RTP/RTCP/S11/SV protocols may facilitate root-cause analysis. Thus the data volume reduction may be performed by determining the dominant normal protocol sequences (for example non-problematic call, or Un-answered call) and keeping minimal information for such calls.

In a stable VOLTE network most calls are successful and corresponding protocol KPIs are good. Thus, for a large volume of call related events (e.g., 10 Million calls per day) only a small portion (e.g., less than 5%) of such events correspond to calls with a problematic issue (call drops, call establishment failures, media gaps, etc.). Furthermore, a small percentage of the bad KPIs are due to a specific eNodeb, a specific device type, or user mobility, etc. However, the 95% of good KPI events dominate the amount of data and strongly bias any statistical algorithms. Filtering out 95% of such data with good KPIs may be inadequate because it may remove the conditions around the anomalies with which to compare data from bad KPIs. Thus, in some examples described herein, the collection module 120 may first select the events with anomalous KPIs, extracting the dimension value of those events (e.g., eNBs, device types, SGWs, APN, QCI etc.), and extract the events for those dimensions from the original large data volume.

For example, if registration failures are high, and the dimensions show, "device types A,B, and eNBs 30,32,40,50, APNs A1,A5," then extracting event data, only when "any of the dimension values match," reduces the amount of data to be analyzed. Feeding the filtered or reduced data to the analytics module 122 and inference module 124 estimates a Problem Diagnosis (PD) by assigning weights to the underlying dimensions. For example, the registration failures could be due to a new vendor device in a particular geographical region of an operator network. This process is repeated for each KPI and the associated anomaly type. The reduced dataset, when fed to the analytics module, facilitates focused visibility to service personnel for additional drilldown and cause analysis.

Additionally, data reduction may include a density-based reduction in which the protocol cause codes (SIP, Q.850, S11, S1-MME, Sv etc.) along with data observations (such as RTP/RTCP media data) such as packet loss, delay, jitter are used to roll-up to a summary Call-KPI (CPI), and the density (%) of each underlying protocol cause is determined, and the top density causes are determined and used to extract information corresponding to the highest density causes. The rules table combines signaling events (SIP cause codes, reason codes, observations from RTP, SRVCC events from Sv interfaces, S11, S1-MME cause codes etc.) for characterizing dropped calls, and the proportion of each cause code to the dropped calls. In one example, it may be determined that 71.17% of dropped calls have inactivity time out after SIP INVITE method. Because the dropped calls are a small proportion of all calls, (for example <5%), filtering out "INVITE+inactivity–timeout", for dropped call analysis from the total dataset is a substantial reduction. The "failure category" in a rules table, as will be described in further detail below, may be determined from the UPLINK/DOWNLINK of the procedure, call-type (Mobile Terminated/Mobile Originated) and the type of cause; for example, for a mobile terminated call, inactivity timeout after SIP INVITE is sent to the mobile device could be due to radio coverage.

VoLTE/VILTE services involve several underlying control plane and user plane protocols. For example, S1-MME control protocol may be used between the MME 112 and eNB 108 to establish User Plane Tunnels through data-plane (S1U) between the SGW 114 and eNB 108. S11 protocol may be used between the MME 112 and SGW 114. SIP relates to the control plane that runs over the S1U user plane. The RTP data plane carries user data packets using S1U tunnels. Each of these protocol packets are received via the capture devices 118a, 118b (which may include, for example, an optical tap or mirror port) and processed in a compute server node which may be part of the collection module 120. The collection module 120 may also be referred to as a Data Capture Engine (DCE).

Each protocol uses bidirectional packets. For example, SIP traffic flows from the User Device (UE) to the IMS Server, and from the IMS server to the UE. The DCE maps both directions of a flow, for example, for a user call, and creates transactional events, such as INVITE, REGISTER etc. Similarly, the collection module 120 maps each call to a User-IMSI (terminating or originating) based on correlating between user plane tunnel and the control plane (S1-MME or S11) that establishes the user plane tunnel. The events have associated status codes that identify Success, Failure Reasons, Progress indication (for example ringing etc.). When a call is successful, an RTP data path is established between caller and callee to exchange user data packets. Due to network conditions such as poor RF conditions, user data packets may get dropped, creating media gaps.

Using principles described herein, loosely characterized KPIs such as successful calls, failed calls, dropped calls, mute calls are characterized based on a plurality of protocol and data exchanges associated with such calls. Some of these KPIs are derived based on SIP alone, and other are based on RTP, S11, or other protocols in addition to SIP. According to principles described herein, information from multiple protocols such as SIP and RTP transactional procedural steps are used along with several other pieces of information such as underlying transport layer tunnel changes due to mobility for a call based on SIP call-ID, transport tunnel IDs on which the SIP traffic is carried, User IP Address & Port Numbers, and S11 etc.

The collection module 120 may also be able to identify VoLTE-To-VoLTE calls. This may be done by analyzing the SIP protocol packets in both directions (uplink and downlink directions on the S1U interface). Specifically, if both the originating and terminating user devices are in the VoLTE RAN, it may be determined that both are VoLTE. This may be achieved using the following steps: Convert From, To Field to a common format. The treatment is different for From & To; (a) Convert all character to same case; (b) Extract string after SIP: or SIP:+, TEL:, TEL:+ and before @ as "Address (Addr)". The string @xxx may or may not appear after Addr; (c) If Addr starts with a digit (0-9) and it's length=10 digits, and the 1st digit is not a zero, prepend with country code 91; With this all digit fields of addr become 12 digits. In the "TO" field any address such as "*41" etc., remain unchanged; (d) Any non-digit strings in the From/To fields will remain same along with "@xx" string. Only 10 digit fields that do not have '0' as the 1st digit will be prepended with 91; (e) If the "dir="Down", swap "From and To" field. The new fields are names as fr2 and to2; (f) FR2TO2=CONCAT(FR2, TO2) Fpr each FR2TO2 count UP & Down. For each FR2TO2, the minimum count gives the number of Volte_to_VOLTE Calls for that From/TO Pair.

This method gives only counts but does not identify which call is V-V or not. To identify each call as V-V or not: repeat steps (a)-(f); Sort in FR2TO2, Record Start Timestamp (tr_starts_ts); For each FR2TO2 compute Delta Time from Previous record (same Fr2TO2). If "dir" of previous & current records differ and the delta-time<300 Seconds, then the call is V-V.

The collection module 120 may also mark certain calls as conference calls, multi-party calls, or calls on hold. This may be done by correlating the plurality of control and user planes (QCI 5 and QCI1), SIP & RTP, S11 & S1-MME and further correlating the time boundaries of SIP & RTP sessions of a user. In VOLTE, the SIP and RTP sessions of a user may traverse on the same GTP-U Tunnels (Overt the TOP VOIP), or unique dedicated bearers for improved QOS. For example, SIP uses QCI5 bearer and RTP uses QCI1 bearers. Multi-party calls are identified, by determining additional INVITEs while one call is active, and multiple sources are present in the RTP packets. In multi-party calls where there are more than two participants, data sources in RTP indicate multiple sources in overlapped time intervals. Multi-party calls are differentiated from hold calls by differentiating time overlapped calls with data from one source only in an interval, and SIP cause codes.

The analytics module 122 takes the event objects from the collection module 120 and classifies them based on the information contained within the event objects. This may be done, for example, through use of a rules table. More detail on the rules table are discussed in U.S. application Ser. No. 16/962,822, titled "Telecommunication Event Object Classification Based on Information from Multiple Protocols," filed on Dec. 15, 2021. In short, the rules table may include several entries, each entry having a combination of parameters corresponding to data points in the event objects. Each entry may also be associated with one or more KPIs. For example, various combinations of data points from an event object may be associated with a dropped call KPI or a failed registration KPI. Classification mechanisms other than the rules table may be used as well. Additionally, there may be more specific versions of a KPI. For example, for the failed registration KPI, there may be a number of sub-KPIs such as a failed registration paired with a specific cause code and/or reason code.

The analytics module 122 takes the classified event objects and performs various functions to infer relationships from those event objects. For example, in addition to the data points used to classify the event objects, the event objects include several other data points such as type of devices used in the call, geographic location, information from user device, information from other network elements (e.g. OSS/NMS), external information outside of the network and other data points that may be associated with the call and used as inputs. The inference module 124 may infer relationships between those inputs and the KPIs associated with those event objects. This may be done, for example, using a machine-learning function.

The inference module 124 produces many models depending on the input data and each specified output. Machine-learning techniques generally involve comparing input data (e.g., device type, geographic location, network route) with a specified output (e.g., KPI) in order to derive a model that describes the relationship between the input and the output data. As additional data is collected regarding the input and the actual output, the model is updated.

The inference module 124 may selectively choose a mix of event objects that correspond to a desired ratio of "negative" events with corresponding "positive" events. For example, for every event object classified as a failed registration, the inference module may include ten event objects classified as a successful registration. This ratio may be selected by an administrator to achieve desired results.

In some examples, the inference module 124 may have the ability to iteratively add data to the event objects from varying sources (user devices, external sources, other network elements), without worry of having to perform all of the necessary steps of machine learning function fitting. In other words, the inference functions within a product embodying principles described herein may be configured to add various pieces of input and look for confidence scores of most probable cause. If a threshold level of confidence is not achieved, the inference functions may automatically add more pieces of information and see if the confidence scores for a particular KPI have increased. This may be done while the user is using the product embodying principles described herein without relying on traditional approach of introducing data scientists to retrain the model.

By using the automated KPI generation, and classification techniques described herein, the data may be better formatted for efficiently inferring relationships between input parameters and KPIs in order to determine probable causes of issues.

Figure 2:
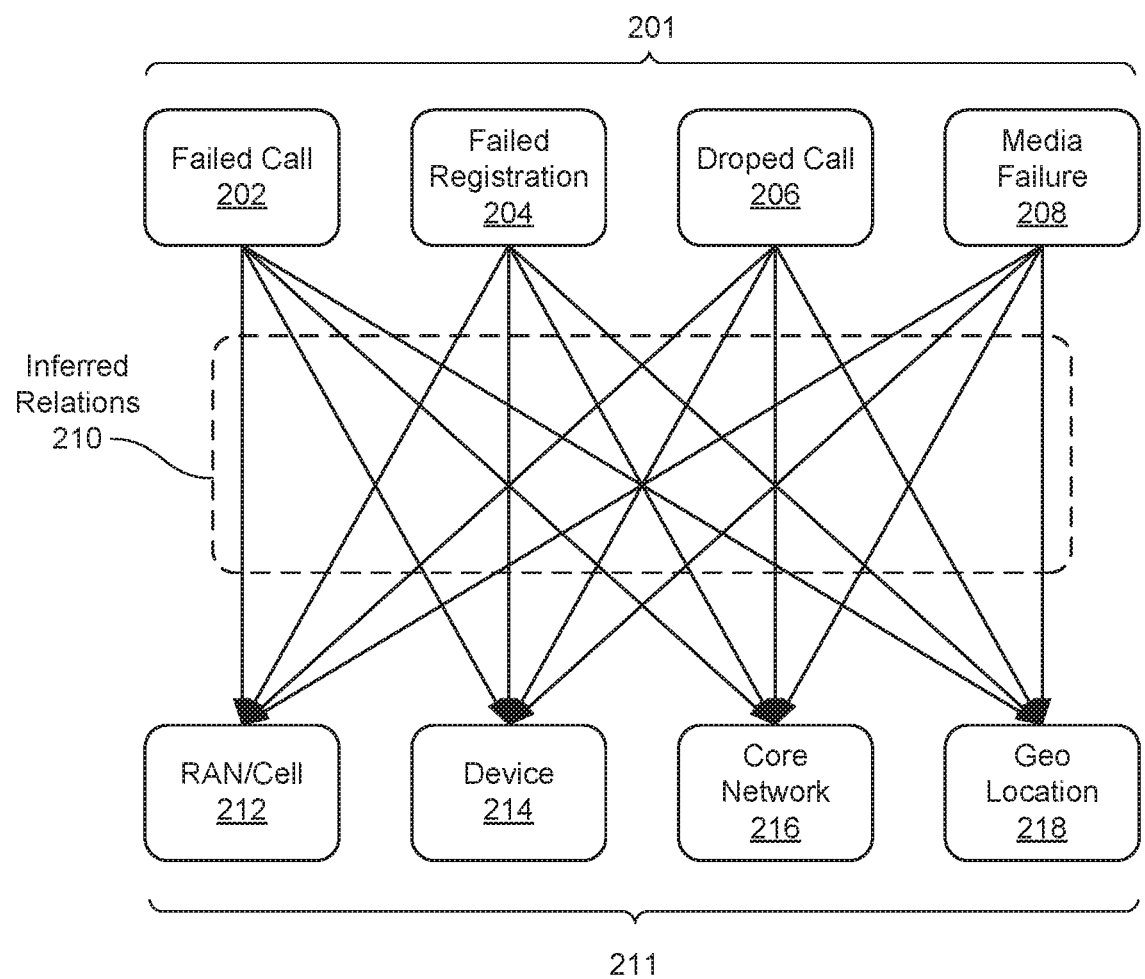
FIG. 2 is a diagram showing illustrating inference of relationships between KPIs and event parameters, according to one example of principles described herein.

FIG. 2 is a diagram showing illustrating inference of relationships between KPIs 201 and event parameters 211, according to an example embodiment. The event parameters 211 include RAN/cell, device 214, core network 216, and geographic location 218. These event parameters may be associated with a particular event object. For example, an event object representing a particular call may specify which pieces of hardware within the RAN were involved (e.g., which eNodeB/cell was connected wirelessly to a mobile device) and thus the geographic location of the call. The event object for the particular call may also specify the model and manufacturer of the mobile device. The event object for the particular call may also identify which pieces of hardware (e.g., servers), respective model, manufacturer, software versions within the core network were involved with the call.

As also described above, the analytics module 122 may assign a KPI to a particular event object based on transactions from various protocols associated with the event object. The inference module is then used to infer relationships between the parameters 211 of the event object and the KPI assigned to it. FIG. 2 illustrates a number of "bad" KPIs, which include a failed call 202, a failed registration 204, a dropped call 206, and a media failure 208. Other KPIs are contemplated as well.

Figure 3A:
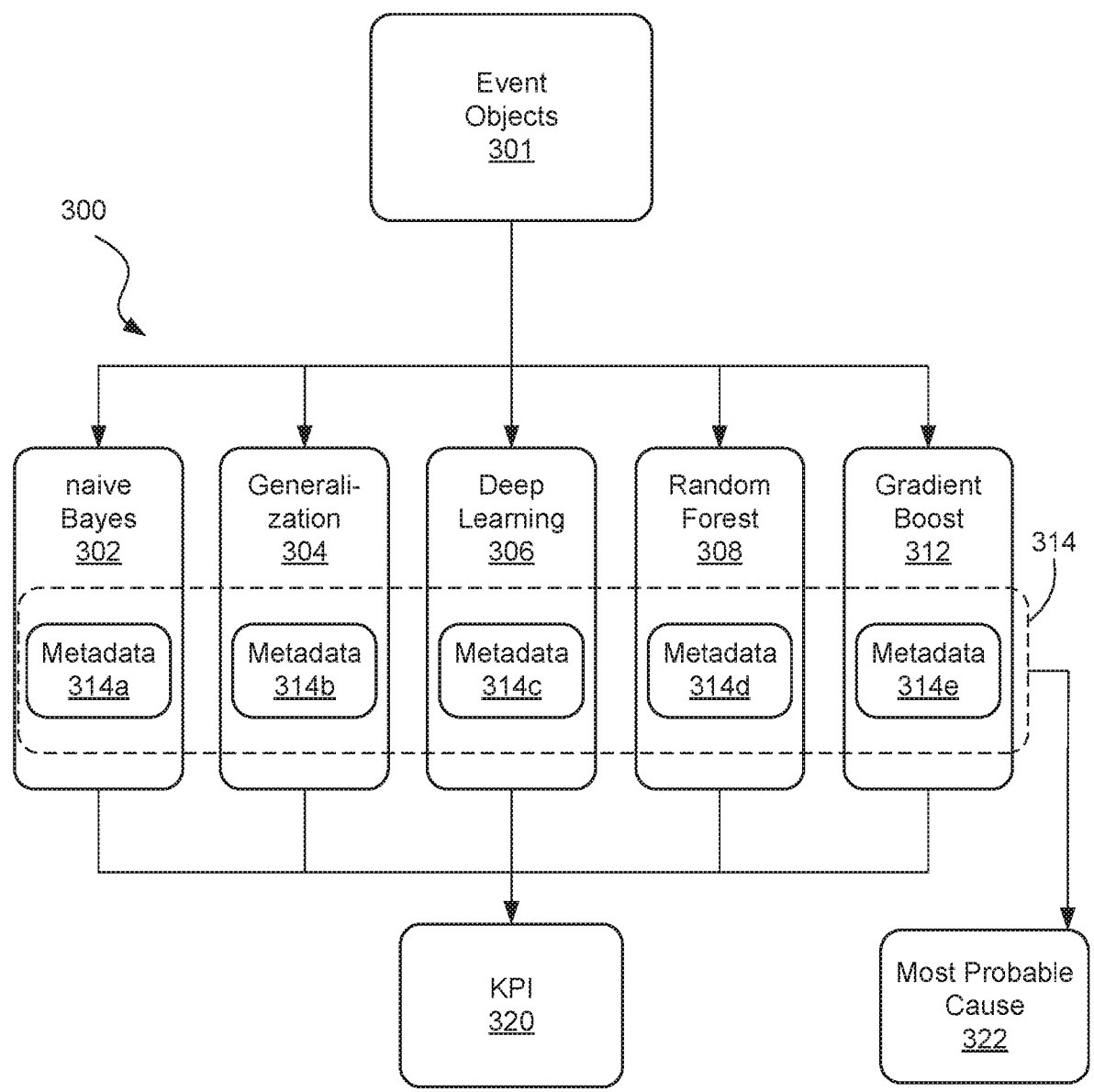
FIGS. 3A and 3B are diagrams showing utilization of metadata from multiple inference functions to determine the most probable cause for a KPI, according to one example of principles described herein.

FIG. 3A is a diagram showing utilization of metadata from multiple inference functions to determine the most probable cause for a particular KPI. In the present example, a set of event objects 301 associated with the failed registration KPI are applied to various inference functions. Inference functions may include, for example, machine learning functions. Machine learning functions are used to create models that define the relationships between a set of inputs and a set of outputs. Thus, using the models created by such machine learning functions, one can predict that with a certain set of inputs, a certain set of outputs will result. However, predicting the output does not necessarily identify which of the inputs is driving the outputs.

According to principles described herein, a set of event objects for a particular KPI are provided to multiple different inference functions. The multiple different inference functions may vary in a variety of ways. In the example of FIG. 3A, the inference functions vary by model type. For example, the event objects 301 may be applied to a naive Bayes function 302, a generalization function 304, a deep learning function 306, a random forest 308 function, and a gradient boost function 312. In some examples, the event objects 301 may be applied to two or more inference functions. Other types of inference functions may be used as well.

Each of the inference functions 300 may produce metadata 314. For example, the naïve Bayes function 302 may produce metadata 314a, the generalization function 304 may produce metadata 314b, the deep learning function 306 may produce metadata 314c, the random forest function 308 may produce metadata 314d, and the gradient boost function 312 may produce metadata 316. Using this metadata 314, the analytics platform may determine which of the input parameters is driving the output based on which are the dominant metadata across multiple inference functions. The input parameter(s) driving the decision towards the KPI 320 may be deemed the most probable cause 322 for the KPI.

As an example, a network operator may wish to know why failed registrations are occurring. Thus, the analytics platform may collect a certain number of event objects that have been associated with a particular failed registration along with an equivalent, or approximate, set of successful registrations. Each of these objects may be passed through the multiple inference functions. The metadata 314 from those inference functions may then be used to determine that a particular device model drives a particular KPI. For example, for a decision tree-based model, the meta-data may consist of one or more nodes through a tree traversal that have the most number of failed registrations at a particular point or conversely a node that has the most successes as a field that can be ruled out as a cause. A decision tree may harvest multiple paths of traversal. In a random forest, which may only use a subset of the input features, the meta data may consist of finding the fields that consistently reflect as the top-level split, or second-level spilt. Alternatively, random forest may use a combination of level splits along a traversal with degrading weight. In yet another example, a deep learning function such as a neural network, the fields may be realized by iteratively running the models removing fields and determining which field resulted in the most information loss. By combining the input field occurrences across these observations in a weighted fashion across one or more of the different inference models and/or across multiple instances of the same inference models with different input variations a scoring is produced for each input field which can be from highest to lowest relationship to the KPI outcome. Over all of this analysis, it may then be determined that that device model is the most probable cause for the KPI, and inspection of the proposed outcome across the entire data set may further confirm the observation. In another example, it may be determined that a particular set of end-users are driving the KPI. Thus, the network operator may investigate the configuration settings of those end-users further to determine a solution to the problem.

In some examples, to further reduce the amount of data to be processed, for a particular KPI, the analytics platform may take only the top subset of data for a particular input parameter. For example, for the device parameter and the failed registration KPI, data for only the top n devices associated with a failed registration may be used. For example, it may be determined that device A is associated with 30,000 failed registrations, device B is associated with 25,000 failed registrations, and device C is associated with 500 failed registrations. In such case, the inference module may use only event objects associated with device A and device B while not using event objects associated with device C (i.e., n is two). For some KPIs, the metadata of inference functions may show multiple dimensions, for example, registration failures, may be dominant for device type A in region X. This may be due to the specific region not supporting the device type or not being upgraded to the latest software releases. In much larger data sets, the inference module may use the top fifteen devices out of 150 different devices associated with the failed registration KPI (i.e., n is fifteen). Other parameters may also use this type of data reduction. For example, event objects associated with the top ten eNodeBs for the RAN parameter may be used.

Figure 3B:
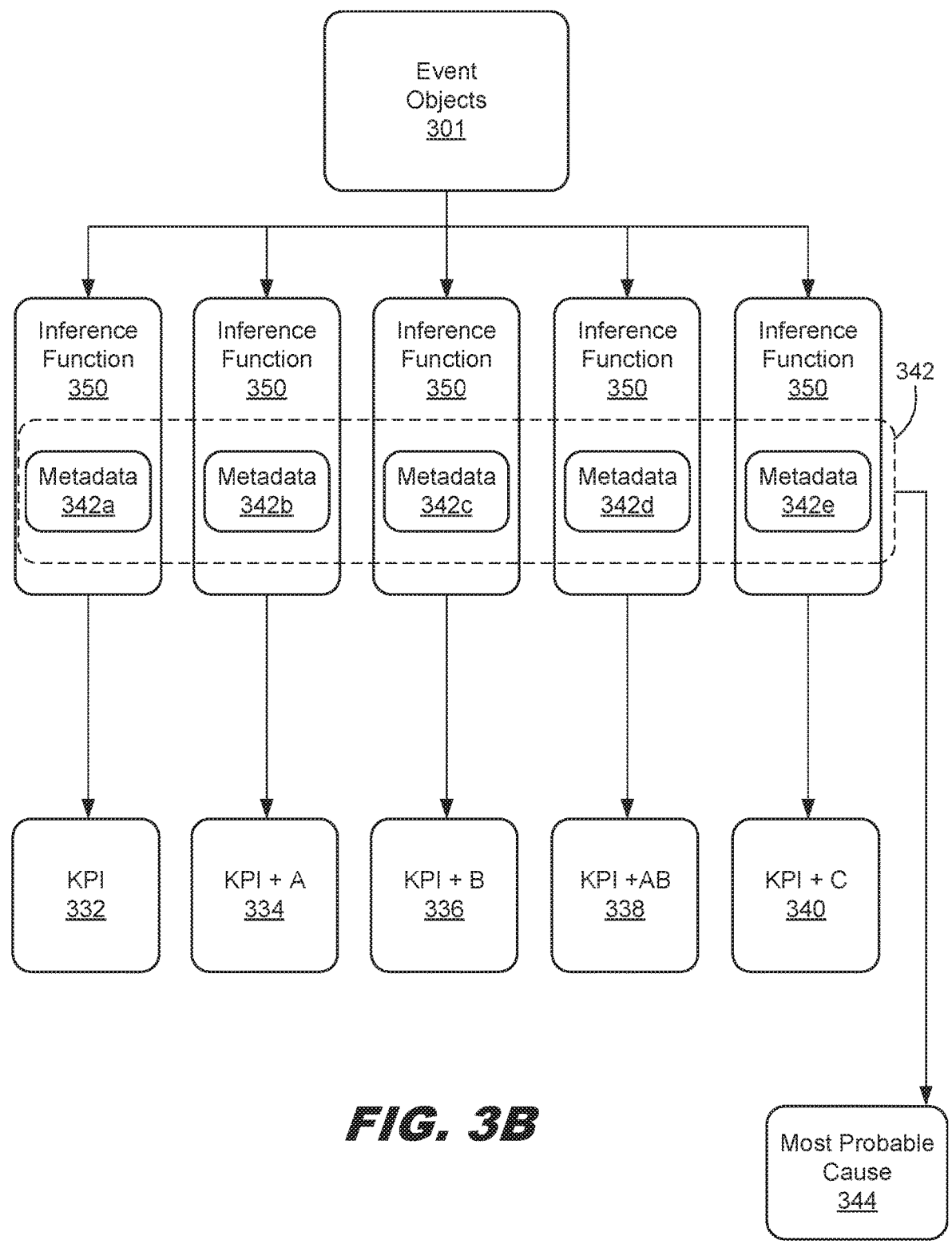

Other types of variation may be used. For example, as shown in FIG. 3B, the variation in inference functions may be for different KPIs. The different KPI's may be subsets of a broader KPI. More specifically, FIG. 3B illustrates event objects 301 being applied to an inference function 350 with different KPIs. In FIG. 3B, an inference function 350 is applied to KPI 332, KPI+A 334, KPI+B 336, KPI+C 338, KPI+AB 338, and KPI+C 340. The metadata 342 for each of those applications of the inference function 350 may then be analyzed to determine the most probable cause 344.

As a more specific example, the broad KPI 332 may be a dropped call. Narrower KPIs may include a dropped call paired with a reason code (KPI+A 334) or a dropped call paired with a cause code (KPI+B 336). In some examples, the inference function 350 may be applied to a KPI with both the cause code and reason code (KPI+AB 338) and/or a cause code. Narrower KPIs may also include a dropped call paired with other pieces of information such as device type (KPI+C 340). In some examples, the KPI variations may be automatically generated based on protocol or domain-specific knowledge of underlying failures.

In another type of variation, the inference functions may use different combinations of inputs. For example, one inference function may look at a first set of input parameters while a second inference function may look at a second set of input parameters. In some examples, the first set and the second set may at least partially overlap. In some examples, the first set and the second set may be exclusive. In some examples, more than one type of variation may be applied. In other words, metadata may be analyzed from multiple types of models, with various types of KPIs, and various types of inputs in order to determine the most probable cause.

Figure 4:
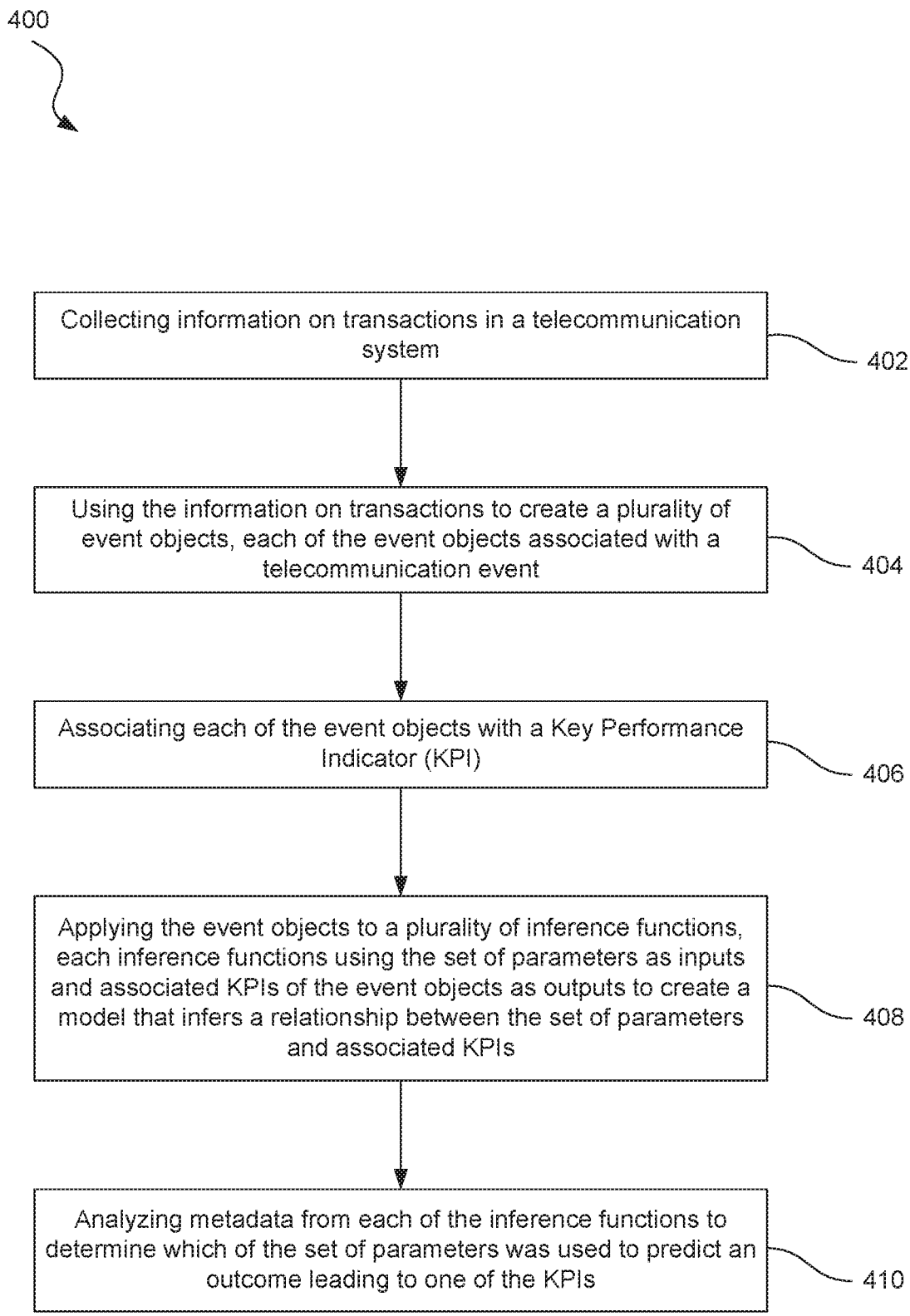
FIG. 4 is a flowchart showing an illustrative method for determining the most probable cause of a KPI of a telecommunication system, according to one example of principles described herein.

FIG. 4 is a flowchart showing an illustrative method 400 for determining the most probable cause of a KPI of a telecommunication system. In this example, method 400 may be performed by the analytics platform 101 of FIG. 1. According to the present example, the method 400 includes a process 402 for collecting information on transactions in a telecommunication system. Such information may include various protocol events such as SIP INVITE transactions, S1U user plane tunnel creations, RTP data event records at regular events, cell handover events, handovers from LTE to UMTS/CS domain (Sv Records) etc. The information may be obtained by various capture devices placed within a telecommunication network, such as an LTE network. For instance, probes may replicate packets and send them to the analytics platform 101, where the analytics platform 101 parses those packets to understand the information therein for any relevant protocol.

The method 400 further includes a process 404 for using the information on transactions to create a plurality of event objects, each of the event objects associated with a telecommunication event. A telecommunication event may be, for example, a call between two or more parties or an attempted call. Each call or call attempt may involve one or more transactions. Thus, a collection module may use information relating to transactions from multiple different protocols and assign such transactions to a particular event. Data associated with that event may then be stored in a data structure referred to as an event object.

The method 400 further includes a process 406 for associating each of the event objects with a Key Performance Indicator (KPI). Specifically, the information within the event object may be used to associate an object with a particular KPI. As described above, KPIs may include failed registration, successful registration, failed call, dropped call, successful call, media gaps, one-way call, and media failure. In the present invention, KPIs may be expanded to include other information such as KPI+SIP Cause Code for certain class of problems, or KPI+SIP Cause Code+Q.850 Reason Code. In this way each of these new KPIs can be used creating hundreds or thousands of outcomes. The exact expansion of the KPI is protocol and domain specific so media failures may not have SIP cause codes but rather can utilize such information as data direction, binning data loss into buckets. In some examples, a rules table may be used to assign a particular event object to a KPI.

The method 400 further includes a process 408 for applying the event objects to a plurality of inference functions, each inference functions using the set of parameters as inputs and associated KPIs of the event objects as outputs to create a model that infers a relationship between the set of parameters and the associated KPIs. The inference functions may be, for example, various types of machine learning functions.

The method 400 further includes a process 410 for analyzing metadata from each of the inference functions to determine which of the set of parameters was used to predict an outcome leading to one of the KPIs. As described above, while the model allows one to predict that for a certain set of inputs, which outputs are likely. However, the metadata may be used, according to principles described herein, to identify which specific parameters lead to the models to the outcome. In other words, it may be determined which of the input parameters was primarily responsible for driving the output. The input parameter that drives the model to the KPI may be deemed the most probable cause of the KPI. In other words, if a particular type of network element or server within the core network tends to drive the model towards the KPI of dropped calls, then that particular type of server may be deemed the most probable cause of the KPI.

In some examples, after one or more probable causes are identified, such causes may be presented to a user. The causes (i.e., input parameter information) may be presented in a prioritized order from most-likely to least-likely of reasons for the particular KPI failure for inspection. This allows the user to take steps to mitigate the KPI failure.

Using the techniques disclosed herein, network operators may be able to efficiently determine which elements in a complex network are likely to be causing various types of problems. This allows the network operator to utilize resources efficiently to diagnose and thus address network problems.

Figure 5:
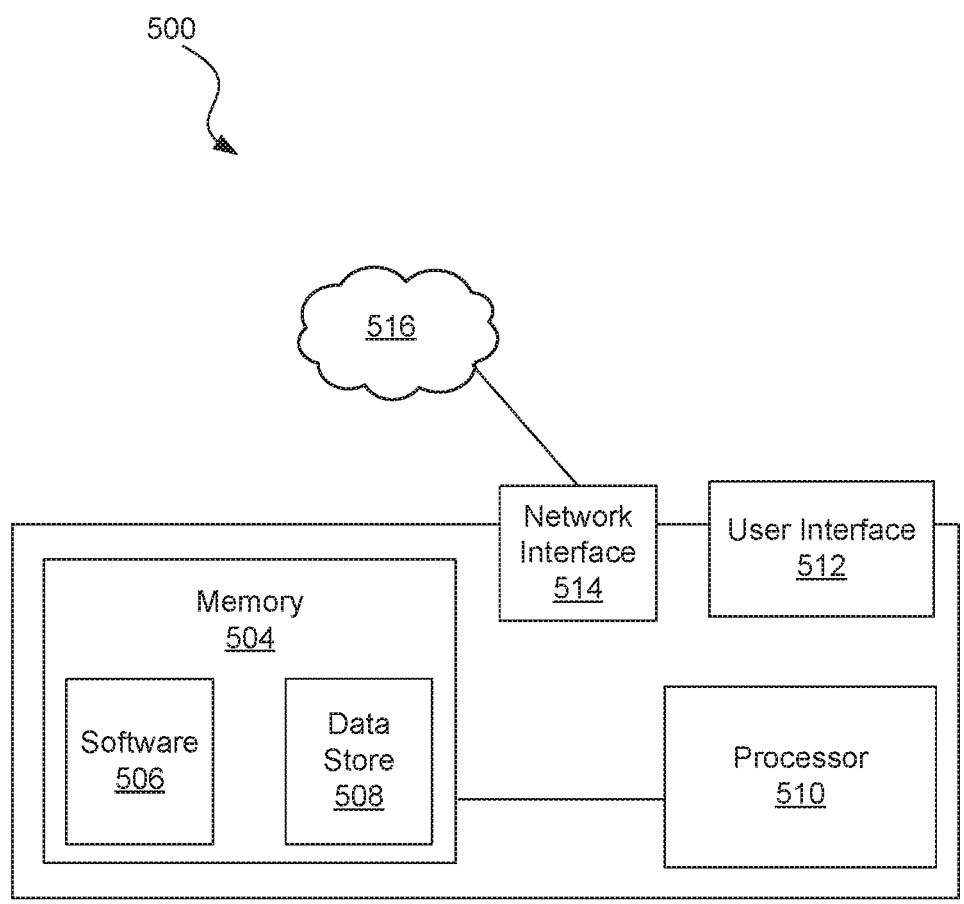
FIG. 5 is a diagram showing an illustrative computing system that may be used to perform the functions related to event object classification described herein.

FIG. 5 is a diagram showing an illustrative computing system that may be used to perform the functions related to event object classification described herein, such as the functions described above in the text accompanying FIG. 4. In other words, the computing system 500 may be used to perform the functions associated with the analytics platform 101. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. The software 506 may be, for example, software designed to provide a web communication feature creation service. In such case, the computing system 500 may be associated with the web communication service. In some examples, the computing system 500 may be associated with a user. In such case, the software 506 may be an application to render web content, such as a browser. The software 506 may include machine readable instructions of a computer program product that when executed, perform the functions described above in accordance with the text accompanying FIG. 4.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system, the method comprising:
    collecting information on transactions in a telecommunication system, including digests of data packets from a core network and a radio access network of the telecommunications system and information from user devices interacting with the telecommunication system;
    using the information on transactions to create a plurality of event objects by correlating the information on transactions between a user plane tunnel and a control plane, each of the event objects associated with a telecommunication failure event, and the event objects including a set of parameters based on the information on transactions;
    associating parameters of the set of parameters of each of the event objects with at least one Key Performance Indicator (KPI);
    applying the event objects to a plurality of machine-learning inference functions, each of the inference functions using the set of parameters as inputs and at least one KPI of the event objects as outputs;
    analyzing metadata from each of the plurality of machine-learning inference functions to determine a first parameter of the set of parameters was used to predict an outcome associated with the at least one KPI, including scoring input field occurrences of the parameters of the set of parameters across the inference functions, the scoring indicating a respective relationship between each one of the input field occurrences and the at least one KPI, and determining that the first parameter of the set of parameters is a most probable cause of the at least one KPI based on the scoring;
    applying additional event objects to the plurality of machine-learning inference functions in response to determining that a confidence score associated with the most probable cause is below a threshold; and
    addressing the most probable cause, including mitigating a network failure associated with the most probable cause.

2. The method of claim 1, wherein the computing system may use a rules table to associate an event object with a KPI.

3. The method of claim 1, wherein the outputs for the inference functions may further include additional information from the plurality of event objects or transformations to further classify outcomes.

4. The method of claim 1, wherein the at least one KPI includes at least one of: successful call attempt, failed call attempt, dropped call, media failure, successful registration, failed registration, inter-working success, and inter-working failure.

5. The method of claim 1, wherein the set of parameters for a specific event object include at least one of the following associated with the telecommunication failure event for the specific event object: gateways involved, cluster, device model, device manufacturer, multimedia server, and media type.

6. The method of claim 1, wherein the inference functions include at least two of: a naive Bayes function, a generalization function, a deep learning function, a decision tree function, a random forest function and a gradient boost function.

7. The method of claim 1, wherein the plurality of inference functions include automatic variations of the at least one KPI based on protocol or domain-specific knowledge of underlying failures.

8. The method of claim 1, wherein the computing system collects data being transmitted between a Radio Access Network (RAN) and a Mobility Management Element (MME).

9. The method of claim 1, wherein the computing system collects data being transmitted between a Radio Access Network (RAN) and a Serving Gateway (SGW).

10. The method of claim 1, further comprising, reducing a number of event objects before passing the event objects through the inference functions.

11. The method of claim 10, wherein reducing the number of event objects includes:
    determining a top n types for a specific input parameter associated with a specific KPI; and
    using only the top n types for passing through the inference functions.

12. The method of claim 1, further comprising, presenting parameter information in a prioritized order from most-likely to least-likely of reasons for a particular KPI failure.

13. A system comprising:
    a processor; and
    a memory having machine readable instructions that when executed by the processor, cause the system to:
    collect information on transactions in a telecommunication system, including digests of data packets from a core network and a radio access network of the telecommunications system and information from user devices interacting with the telecommunication system;
    use the information on transactions to create a plurality of event objects by correlating the information on transactions between a user plane tunnel and a control plane, each of the event objects associated with a telecommunication failure event, and the event objects including a set of parameters based on the information on transactions;
    associate parameters of the set of parameters of each of the event objects with at least one Key Performance Indicator (KPI);
    apply the event objects to a plurality of machine-learning inference functions, each of the inference functions using the set of parameters as inputs and the at least one KPI of the event objects as outputs;
    analyze metadata from each of the plurality of machine-learning inference functions to determine a first parameter of the set of parameters was used to predict an outcome leading to the at least one KPI, including scoring input field occurrences of the parameters of the set of parameters across the inference functions, the scoring indicating a respective relationship between each one of the input field occurrences and the at least one KPI, and determining that the first parameter of the set of parameters is a most probable cause of the at least one KPI based on the scoring;
    apply additional event objects to the plurality of machine-learning inference functions in response to determining that a confidence score associated with the most probable cause is below a threshold; and
    address the most probable cause, including mitigating a network failure associated with the most probable cause.

14. The system of claim 13, wherein the outputs for the inference functions may further include additional information from the plurality of event objects or transformations to further classify outcomes.

15. The system of claim 13, wherein the at least one KPI include at least one of: successful call attempt, failed call attempt, dropped call, media failure, successful registration, failed registration, inter-working success, and inter-working failure.

16. The system of claim 13, wherein the set of parameters for a specific event object include at least one of the following associated with the telecommunication failure event for the specific event object: gateways involved, cluster, device model, device manufacturer, multimedia server, and media type.

17. The system of claim 13, wherein the inference functions include at least two of: a naive Bayes function, a generalization function, a deep learning function, a decision tree function, a random forest function and a gradient boost function.

18. A computer program product comprising a non-transitory machine-readable medium comprising computer program code for execution by a processor, the computer program product comprising:
   computer program code to collect information on transactions in a telecommunication system, including digests of data packets from a core network and a radio access network of the telecommunications system and information from user devices interacting with the telecommunication system;
   computer program code to use the information on transactions to create a plurality of event objects by correlating the information on transactions between a user plane tunnel and a control plane, each of the event objects associated with a telecommunication failure event, and the event objects including a set of parameters based on the information on transactions;
   computer program code to associate parameters of the set of parameters of each of the event objects with at least one Key Performance Indicator (KPI);
   computer program code to apply the event objects to a plurality of machine-learning inference functions, each of the inference functions using the set of parameters as inputs and the at least one KPI of the event objects as outputs;
   computer program code to analyze metadata from each of the plurality of machine-learning inference functions to determine a first parameter of the set of parameters was used to predict an outcome leading to the at least one KPI, including scoring input field occurrences of the parameters of the set of parameters across the inference functions, the scoring indicating a respective relationship between each one of the input field occurrences and the at least one KPI, and determining that the first parameter of the set of parameters is a most probable cause of the at least one KPI based on the scoring;
   computer program code to apply additional event objects to the plurality of machine-learning inference functions in response to determining that a confidence score associated with the most probable cause is below a threshold; and
   computer program code to address the most probable cause, including mitigating a network failure associated with the most probable cause.

19. The computer program product of claim 18, wherein the inference functions include at least two of: a naive Bayes function, a generalization function, a deep learning function, a decision tree function, a random forest function and a gradient boost function.

20. The computer program product of claim 18, further comprising, computer program code to reduce a number of event objects before passing the event objects through the inference functions.

* * * * *